United States Patent [19]

Cantwell

[11] Patent Number: 4,480,281
[45] Date of Patent: Oct. 30, 1984

[54] SYSTEM FOR MOUNTING MAGNETIC TRANSDUCER MEANS ON OPPOSITE SIDES OF A FLEXIBLE ROTATING MAGNETIC DISC

[76] Inventor: Gill Cantwell, 2434 Purdue Ave. #17, Los Angeles, Calif. 90064

[21] Appl. No.: 431,478

[22] Filed: Sep. 30, 1982

[51] Int. Cl.³ .............................................. G11B 5/48
[52] U.S. Cl. ................... 360/104; 360/105; 360/109
[58] Field of Search ............ 360/104, 105, 109, 97.99

[56] References Cited

U.S. PATENT DOCUMENTS

| | | | |
|---|---|---|---|
| 3,940,796 | 2/1976 | Haun | 360/109 |
| 4,028,734 | 6/1977 | Mos | 360/104 |
| 4,306,260 | 12/1981 | Maeda | 360/104 X |

FOREIGN PATENT DOCUMENTS 2741473  3/1979  Fed. Rep. of Germany ...... 360/104
2904716  8/1980  Fed. Rep. of Germany ...... 360/104

Primary Examiner—John H. Wolff
Attorney, Agent, or Firm—Nilsson, Robbins, Dalgarn Berliner, Carson & Wurst

[57] ABSTRACT

A pair of arms to be positioned one on each side of the flexible rotating magnetic disc. Each of the arms carries a magnetic transducer means which engages the surface of the magnetic disc for the purpose of reading and/or recording data on the rotating magnetic disc. Each of the magnetic transducer means is mounted upon the support arm by a pivotal support allowing limited rotation about a single axis. The axis is displaced only slightly from the magnetic read/write head. The axes of rotation for the two heads are preferably disposed orthogonally to each other. The rotational movement of the transducer means ability is provided by a pair of balls received within pockets provided in opposed relationships between the transducer mounting means and the support arm.

16 Claims, 6 Drawing Figures

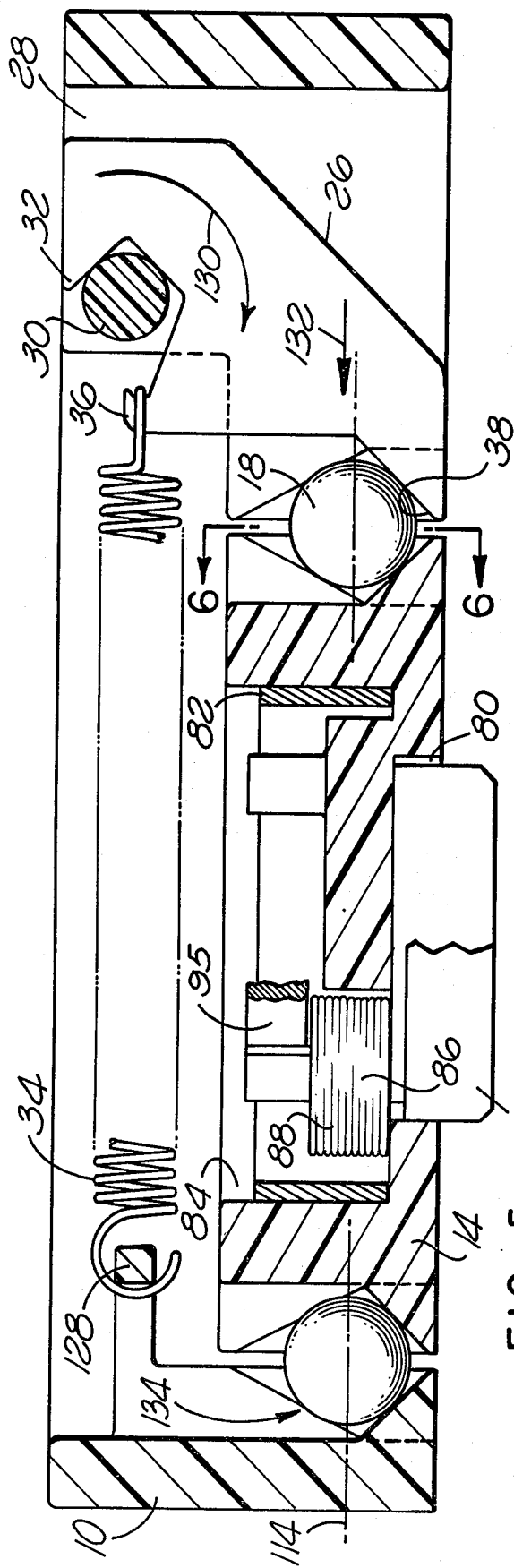
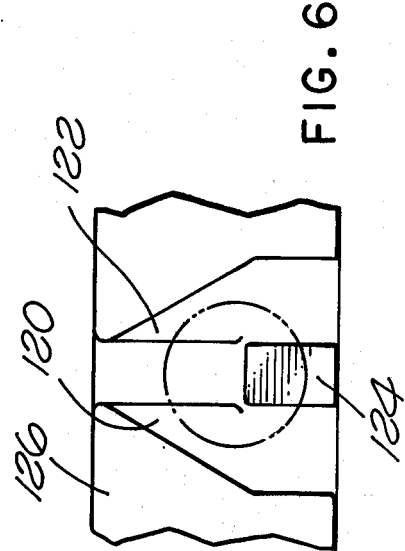
FIG. 5
FIG. 6

SYSTEM FOR MOUNTING MAGNETIC TRANSDUCER MEANS ON OPPOSITE SIDES OF A FLEXIBLE ROTATING MAGNETIC DISC

FIELD OF THE INVENTION

This invention relates to apparatus for magnetic recording on flexible rotating discs, and more particularly to an apparatus for supporting electromagnetic transducers on opposite sides of the flexible rotating discs (the flexible magnetic media) for the purpose of double sided reading/recording thereon.

DESCRIPTION OF PRIOR ART

Subsequent to early work on disc and drum files for data processing systems, the use of contact recording was generally abandoned as air bearing magnetic heads and associated support mechanisms were developed for "flying" a transducer at a small spacing from a magnetic recording surface, to permit intimate interaction between the transducer and the magnetic surface. Contact recording continued to be used in magnetic tape systems, for which multichannel heads were typically employed. However, contact recording for disc media was revived with the introduction of the so-called "floppy" disc system, in which a thin pliant disc element contained within a cover jacket was used in combination with low cost accessing, transducing and control systems.

Floppy disc systems have subsequently found widespread application not only in the program storage and entry applications for which they were originally intended, but also in a wide variety of data entry, storage, and control applications. In the original single sided systems, the transducer structure generally comprises a single channel head with associated erase heads, mounted in a transducer having a contact surface that is a segment of a spheroid or at least curved, the transducer itself being mounted in a carriage element that is accessed to different circumferential tracks on the floppy disc. On the opposite side of the disc from the transducer, and also in contact with the disc, is an elastic, felt pad mounted adjacent the end of a springloaded arm, so as to exert pressure against the pliant disc and elastically deform a localized area of the disc into intimate conformance with the spherical transducer surface when data transfer operations are to take place.

More recently, the floppy disc industry has started to use both sides of the floppy disc for data storage operations, the purpose primarily being to increase capacity.

Thus a single accessing mechanism continues to be employed, and the transducers on opposite sides of the media are in a generally opposed relation, with only a slight offset in the head gaps to avoid flux interaction. Because it was thought necessary to account for deviations in the position of the flexible disc from its nominal position, recording heads and mounts were first used that were essentially derived from the flying head technology. Specifically, a pair of identical slider heads were used, each gimbal mounted on the opposite sides of the media, and mechanically urged together.

Gimbal mounts for this purpose may take many forms: Free moving gimbals such as the ball and socket of U.S. Pat. No. 3,170,149 Koskie et al, and the ring gimbal of U.S. Pat. No. 3,051,954 Osterlund; or hybrid gimbals such as U.S. Pat. No. 3,702,461 Cantwell; or elastic diaphragm and load point gimbals such as U.S. Pat. No. 3,310,792 Groom et al and U.S. Pat. No. 3,931,641 Watrous.

The concept was that as the flexible disc deviates from its normal plane, both of the heads tend to follow the actual position of the disc passing between them and permit contact recording without excessive wear or signal degradation.

If these gimbals are of the freely pivoting type such as Koskie or Osterlund, they have no preferred orientation, and the only factor determining the disc plane is the stiffness of the disc itself. In the complex frictional interaction of the moving disc and the two gimbaled heads, stable operation is difficult to obtain, and temporarily unstable operation after disc start up or carriage motion may require substantial delays before data can be reliably transferred.

If the gimbals are of the hybrid or diaphragm type such as Cantwell, Groom, or Watrous, then in addition to the disc stiffness, the stiffness of the diaphragms assists in establishing a working plane for the disc, however, both gimbal diaphragms must be carefully fabricated and held within narrow angular limits to permit the combination of all elements to operate satisfactorily, and even so, the dynamic instability problems described above still exist.

These dual gimbals are relatively complex, and must be precisely manufactured and are therefore costly. Furthermore, since the roll centers of most designs are not located at the disc surface, offsets from the track centerline occur during the gimballing action, reducing the positional accuracy of the system, which in turn limits the track density which can be achieved.

More recently, an improved apparatus was utilized as described in U.S. Pat. No. 4,151,573 Tandon et al. In this apparatus, one of the two transducers is fixedly mounted in the carriage, and therefore defines a plane against which the magnetic disc is biased by pressure from the second transducer which being gimbal mounted in the usual way, assumes itself the plane of the disc. This apparatus eliminates the instability inherent in the earlier approach. Moreover, it eliminates the expense of one of the gimbal mounts. Since it always operates in a fixed geometric relationship, it also eliminates the track offset problems of the earlier approach.

There are however many problems and limitations arising from the use of this combination of a fixed and a gimballed transducer. The gimballed transducer retains all of the complexity and expense inherent in such a mechanism. Current designs utilize a diaphragm and load point gimbal. These designs require that the diaphragm be carefully adjusted to align the relaxed plane of the gimballed head with the operating plane of the disc within narrow limits to avoid excessive inequality of loading over the transducer surface which leads to unstable elastic and frictional interplay between the media, the head, and the gimbal.

SUMMARY OF THE INVENTION

An apparatus for supporting a pair of magnetic transducers, one on each side of a pliant magnetic recording medium, which includes a pair of support arms each of which receives a magnetic transducer means, which magnetic transducer means is mounted for pivotal movement only about a single axis with the axes of pivotal movement of the two transducer means being angularly disposed with respect to each other.

BRIEF DESCRIPTION OF THE DRAWINGS

FIG. 5 is a cross sectional view taken about the lines 5—5 of FIG. 4; and

FIG. 6 is a view taken about the lines 6—6 of FIG. 5 illustrating the pocket for receiving a ball to provide a pivot.

DETAILED DESCRIPTION

The supporting structure constructed in accordance with the present invention provides a simple one axis pivotal mounting for a magnetic transducer for use with a rotating disc constructed of pliant or flexible magnetic recording medium. The various members comprising the apparatus are constructed of molded plastic and include a simple, positive mounting arrangement between the transducer mounting assembly and the supporting arm therefor. Through utilization of a simple transducer mounting arrangement as is disclosed in the present invention there is provided extremely accurate recording and reading of data upon the rotating magnetic disc with a relatively simple structure which can be easily assembled and disassembled and which creates minimal wear on the surface of the disc.

Figure 1:
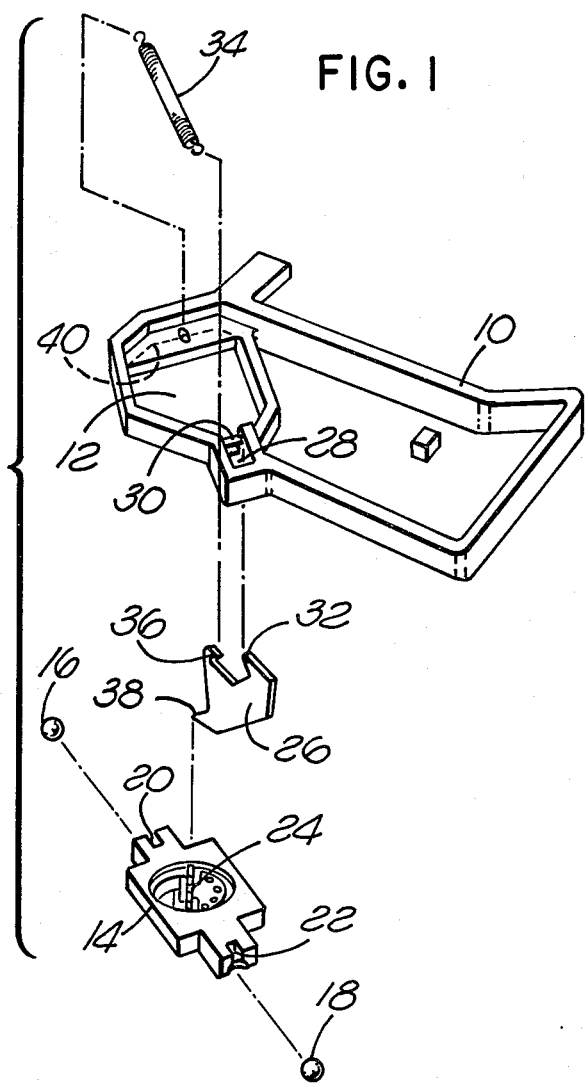
FIG. 1 is a schematic view, in exploded form, illustrating the upper support arm which receives the transducer mounting assembly constructed in accordance with the present invention.

FIG. 1 generally illustrates in schematic representation only, the support arm within which there is received the magnetic transducer held within its mounting assembly. The support arm includes a body member 10 which is molded from plastic material, preferably a glass-filled polycarbonate. The body 10 defines an opening 12 within which there is received a transducer mount 14. The transducer mount 14 is pivotally supported within the opening 12 by a curved surface preferably defined by a pair of balls 16 and 18 which are received within pockets 20 and 22 which are molded as an integral part of the mount 14. The transducer head 24 is positioned within the mount 14 by being properly inserted into an opening defined therein, after which the head is secured in place by adhesive materials or the like.

The mount 14 with the balls 16 and 18 are appropriately placed within the opening 12 after which a keeper 26 is positioned within a slot 28 extending from the opening 12 in the arm 10. A pin 30, which may be integrally molded with the arm 10, operates to retain the keeper on the arm 10 by way of the extension 32 thereof. A spring 34 is affixed to the hook 36 on the keeper 26 to thereby retain the keeper 26 in place and to apply a force against the ball 18 by contacting it with the surface 38 on the keeper and thereby to bias the balls 18 and 16 along with the mount 14 toward the edge 40 of the opening 12. In this manner, the transducer mount with the head 24 positioned therein is firmly seated at a predetermined point within the support arm 10 and is permitted to pivot about an axis through the balls 16 and 18 so as to be rotatable only about that axis.

Figure 2:
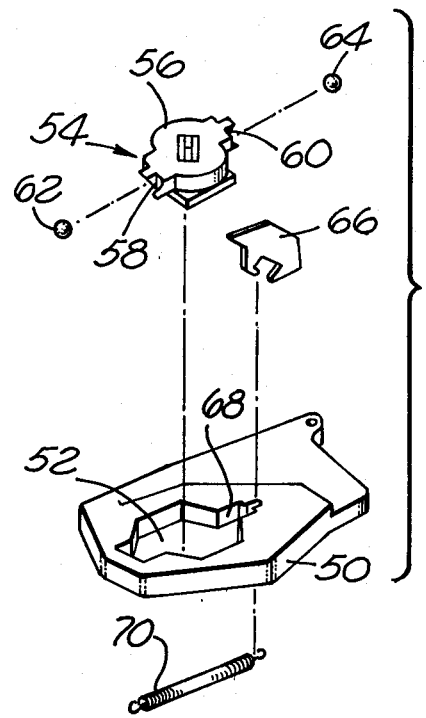
FIG. 2 is a view similar to FIG. 1 but showing the lower supporting arm.

FIG. 2 illustrates a similar structure to that of FIG. 1 but which is designed to receive the opposed magnetic transducer, in this instance the lower transducer. As is shown in FIG. 2 a support member or arm 50 defines an opening 52 therein for receiving the lower transducer mount 54 which has the head 56 received therein. As with the mount 14, the mount 54 defines a pair of sockets 58 and 60 within which are positioned balls 62 and 64, respectively. The balls are received within appropriate opposing sockets defined by the arm 50 to permit pivoting of the mount 54 about the axis drawn through the balls 62 and 64. Again a keeper 66 fits within a slot 68 and is retained therein by the spring 70 in precisely the same manner as that described with respect to the keeper 26 shown in FIG. 1.

Figure 3:
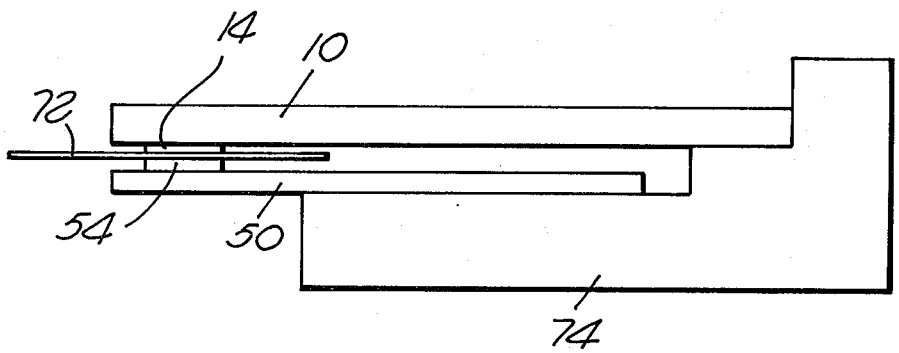
FIG. 3 is a schematic representation showing the structures of FIGS. 1 and 2 mounted upon an appropriate positioning carriage shown in block diagram form.

After assembly, the structures shown in FIGS. 1 and 2 are disposed on opposite sides of a pliant rotating magnetic recording/reading medium 72 (a floppy disc) as shown in FIG. 3. As is noted, the magnetic transducers 14 and 54 are on opposite sides of the media 72 with their axes of rotation angularly disposed with respect to each other (FIGS. 1 and 2). As will be recognized by those skilled in the art, the structure of FIG. 3 is schematic only in that detailed structures for positioning, driving the media and accomplishing the various recording and reading techniques are not illustrated. The positioning apparatus for the transducers 14 and 54 is shown in block form at 74 only. Those skilled in the art will recognize that the positioning apparatus may take various forms.

Figure 4:
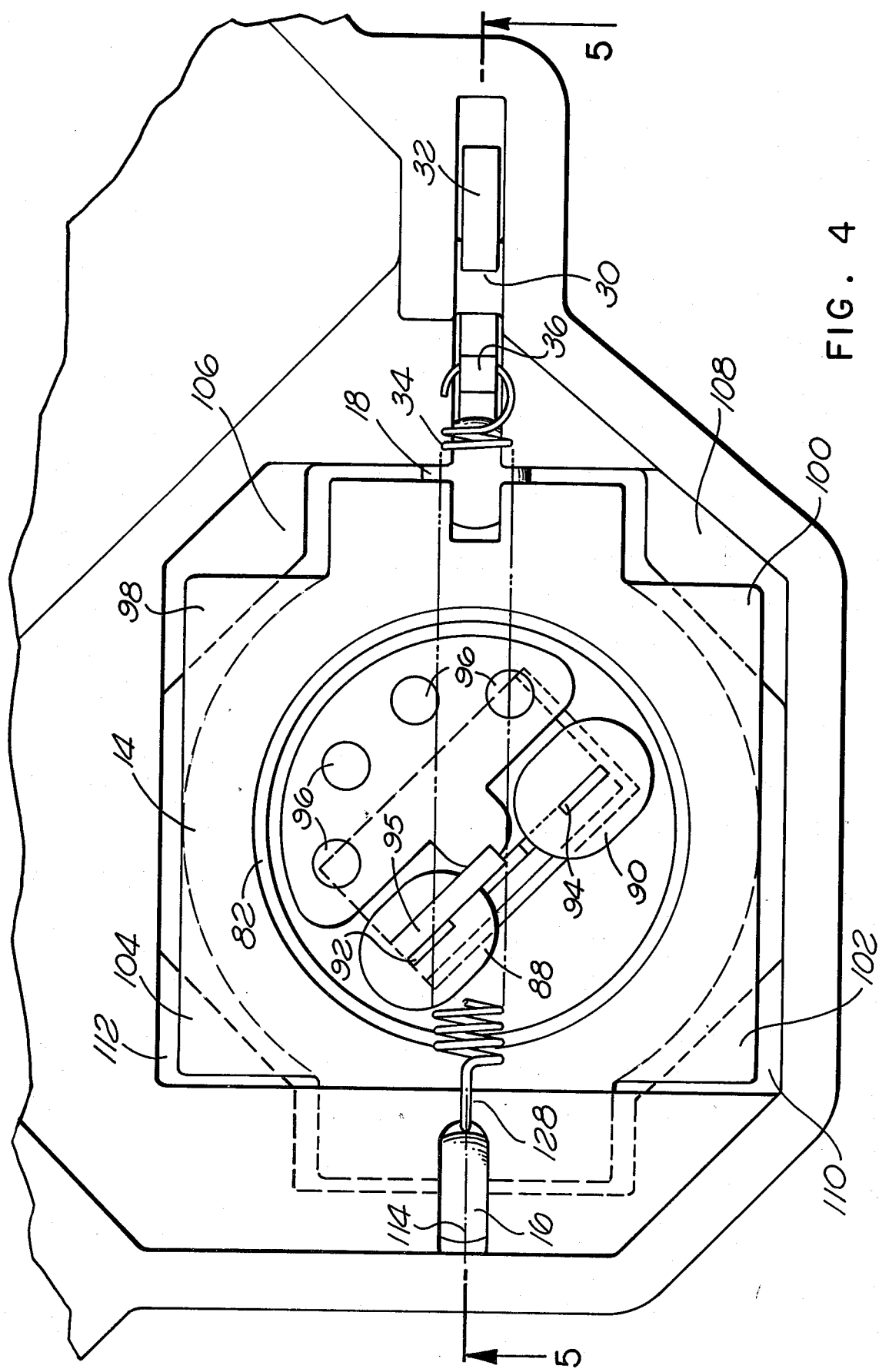
FIG. 4 is a top plan view of a portion of the arm illustrated in FIG. 1 showing the structure in its assembled form.

Referring now more particularly to FIGS. 4 and 5, there is illustrated the cooperative relationship between the transducer mount and the support arm. It will be recognized by those skilled in the art that FIG. 4 is a top plan view of the assembled apparatus as illustrated in FIG. 1. The apparatus shown in FIG. 2 is similar in structure as will be thoroughly understood by a review of the structures shown in FIGS. 4 and 5.

As is shown, the mount 14 defines a recess 80 which receives the head 24. After the head 24 is properly positioned within the recess 80, it is secured therein by means of adhesive or the like as is well known to those skilled in the art. Thereafter, a high permeability magnetic shield ring of Mu metal or the like 82 is installed in the recess 84 provided in the mount 14. Coils 86, 88 and 90 are disposed upon the posts 92 and 94, respectively and thereafter the butt bar 95 constructed of a ferrite material is cemented into place completing the mount assembly. These assemblies are identical for the upper and lower transducers. The magnetic coil wires from the coils 86, 88 and 90 are wrapped around the posts 96 formed as part of the mount 14.

The mount 14 additionally includes flanges 98, 100, 102 and 104. These flanges cooperate with additional flanges 106, 108, 110 and 112, respectively, to limit the extent of pivotal rotation about the axis 114 of the mount 14 which is defined by the balls 16 and 18. It will be noted that the axis 14 passes through the body of the transducer means and its mount and is displaced from the center thereof toward the transducer.

The pockets for receiving the balls 16 and 18 to pivotally support the body 14 are formed by providing depressions at opposite ends of the mount 14 which are positioned in opposed relationship with similar pockets formed in the opposite sides of the opening 12 provided in the arm 10. Each of the depressions is formed in such a way that there is provided a pocket or recess defined by three flat surfaces. When the ball is placed into contact with these three flat surfaces, three points of contact are provided which are equidistant about the axis 114 and displaced approximately 45 degrees therefrom. The construction details are more clearly illustrated in FIGS. 1, 5 and 6. As is shown, the recess or pocket 22 is formed by providing flat surfaces 120, 122 and 124. The surfaces 120 and 122 extend inwardly from the wall 126 forming the outer surface of the mount 14. The surface 124 is effectively formed by a ramp-like portion extending inwardly into the mount body 14. It will of course be understood that the ramp-like portion 124 is an integral molded part of the body 14. The configuration of the pockets such as described has been adopted as most feasible for molding with relative ease. Obviously, other types of formations could be utilized to accomplish the same function and purpose.

As above noted each of the recesses is formed in substantially the same way, with the exception, however, of the recess in the arm 10 into which the ball 18 fits. The recess formed therein is provided without the ramp-like structure at the lower portion thereof. Furthermore, the opening 28 is also provided at this point to receive the keeper 26 as above described. As is noted, when the mount 14 is positioned as shown in FIG. 5, the spring 34 fits around the hook 36 of the keeper 26 and in turn is anchored at the opposite side around a bar 128 formed as part of the arm 10. As a result of the slight offset from the center of the rod 30 to the hook 36, a rotational moment is applied to the keeper 26 to cause it to tend to move in the direction shown by the arrow 130. This movement urges the surface 38 of the keeper 26 against the ball 18 thereby completing the pocket and at the same time applying a force along the axis 114 in the direction shown by the arrow 132 to thereby properly position the mount 14 with respect to the arm 10 and securely position it in the correct position.

To assemble the mount 14 within the arm 10 a stainless steel ball is placed within the recess 134 (FIG. 5), after which the recess 20 is placed in contact with the ball 16 and the transducer assembly or mount 14 is hinged downward about the center of the ball 16 until the flanges 98 and 100 strike the flanges 106 and 108, respectively. In this position the ball 18 can be installed in the recess 22. Thereafter the transducer mount 14 can be pivoted upward around the center of the ball 18 until it strikes the surfaces at the upper portion of the recess formed in the arm 10. At this point the keeper 26 is placed in the slot 28 from the bottom of the arm 10 (as shown in FIG. 5) with the arm 32 placed in position over the bar 30. In this manner the retaining recess is completed by the surface 38 on the keeper 26 to retain the ball 18 in position. The spring 34 is then positioned as shown in FIGS. 5 and 6 to thereby bias the keeper 26 as above described.

There has thus been described a precise low cost, low friction pivot for the magnetic transducer whose axis is parallel to the disc surface and is quite close to the disc surface. It will also be recognized that the axis of rotation for the transducer in the two support arms is disposed preferably orthogonally with respect to each other. It will, however, be understood that the axes of rotation may deviate substantially from the orthogonal without loss of substantial ability.

What is claimed is:

1. Apparatus for supporting a pair of magnetic transducers one on each side of a pliant magnetic recording medium and in operative relationship therewith comprising:

(A) a pair of support arms disposed for receiving a magnetic recording medium therebetween;
(B) a pair of magnetic transducer means;
(C) first means for mounting one of said transducer means for pivotal movement only about a first single axis substantially parallel to a plane defined by said recording medium on one of said support arms;
(D) second means for mounting the other of said transducer means for pivotal movement only about a second single axis substantially parallel to a plane defined by said recording medium on the other of said support arms; and
(E) said first axis being angularly disposed with respect to said second axis.

2. Apparatus as defined in claim 1 wherein said first and second mounting means each includes a curved surface.

3. Apparatus as defined in claim 1 wherein said first and second mounting means each includes a curved surface disposed on opposite sides of each said transducer means.

4. Apparatus as defined in claim 3 wherein said curved surfaces are substantially spherical.

5. Apparatus as defined in claim 4 wherein said curved surfaces are defined by a pair of spheres mounting each said transducer means on each said support arm.

6. Apparatus as defined in claim 1 wherein each said transducer means includes a body member defining first and second cavities, and said mounting means includes means defining a pair of curved surfaces, one of said surfaces being received in each said cavity for defining said pivotal axis for one of said transducer means.

7. Apparatus as defined in claim 6 wherein said axis passes through the body of said transducer means.

8. Apparatus as defined in claim 6 wherein said support arms each defines a pair of cavities, each cavity on a support arm being juxtaposed a cavity on said body member, said means defining said curved surfaces being spheres, one sphere being received within each pair of juxtaposed cavities.

9. Apparatus as defined in claim 8 wherein said first and second cavities in said body member are each defined by a plurality of flat surfaces, each making substantially only point contact with said sphere received therein.

10. Apparatus as defined in claim 9 wherein said cavities in said support arm are defined by a plurality of flat surfaces, each making substantially only point contact with said sphere received therein.

11. Apparatus as defined in claim 10 which further includes means for applying a force along each said axis for biasing said mounting means toward one of said cavities.

12. Apparatus as defined in claim 11 wherein said force applying means is a spring means supported on each said support arm.

13. Apparatus as defined in claim 12 wherein one of said flat surfaces defining one of said cavities in each said support arm is defined by a pivotally disposed keeper member, one of said spring means engaging each said keeper.

14. Apparatus as defined in claim 13 wherein each of said cavities is defined substantially by three flat surfaces.

15. Apparatus as defined in claim 1 wherein said axes are disposed orthogonally with respect to each other.

16. Apparatus for supporting a pair of magnetic transducers, one on each side of a pliant magnetic recording medium and in operative relationship therewith comprising:
- (A) a pair of support arms disposed for receiving a magnetic recording medium therebetween, each of said support arms defining first and second cavities defined substantially by three flat surfaces and disposed in opposed relationship therein;
- (B) a pair of magnetic transducer means each of said transducer means including a body member having third and fourth cavities therein and defined by a plurality of flat surfaces, said third and fourth cavities being juxtaposed said first and second cavities respectively;
- (C) first means for mounting one of said transducer means in each of said support arms for pivotal movement only about a single axis and including a spherical member disposed within each of said juxtaposed cavities and making substantially only point contact with said flat surfaces, a pivotally disposed keeper member disposed upon each of said support arms and defining one of said flat surfaces of one of said opposed cavities in said support arms, and spring means engaging said keeper member for applying a force along said axis, one of said spheres being insertable into one pair of said juxtaposed cavities in the absence of said keeper member.

* * * * *